United States Patent [19]

McCain et al.

[11] 4,169,631
[45] Oct. 2, 1979

[54] SPROCKET-TYPE LOOP CARRIER

[75] Inventors: David L. McCain, Ponca City, Okla.; Ronald W. Umphrey, Fairmont, W. Va.

[73] Assignee: Continental Oil Company, Ponca City, Okla.

[21] Appl. No.: 854,936

[22] Filed: Nov. 25, 1977

[51] Int. Cl.² ............................................. B65G 53/30
[52] U.S. Cl. ...................................... 406/40; 137/344
[58] Field of Search ............. 302/14; 137/344, 355.16, 137/355.17; 74/243 C, 243 NC, 243 FC; 191/12 R; 198/729

[56] References Cited

U.S. PATENT DOCUMENTS

| | | | |
|---|---|---|---|
| 1,326,785 | 12/1919 | Riley | 198/729 |
| 2,803,498 | 8/1957 | Touton | 137/344 |
| 3,860,027 | 1/1975 | McCain et al. | 302/14 |
| 3,893,474 | 7/1975 | Umphrey et al. | 302/14 |
| 3,955,593 | 5/1976 | Umphrey et al. | 302/14 |
| 3,961,772 | 6/1976 | Sweeney | 137/355.16 |

FOREIGN PATENT DOCUMENTS 537666  5/1922  France .................................. 74/243 NC

*Primary Examiner*—Robert B. Reeves
*Assistant Examiner*—Jeffrey V. Nase
*Attorney, Agent, or Firm*—William J. Miller

[57] ABSTRACT

A conveyor apparatus for moving a slurry line supported above the ground by a plurality of wheeled carts which are interconnected by one or more linkages, through a 180° bend by having a disc journaled to a platform through the axis of the disc. Notches are formed in the periphery of the disc for receiving a wheel and a portion of the cart which extends outward from the linkage. Linkage retaining means extends from the periphery above and below the linkage and traps the linkage against the disc during the 180° bend. On each side of the platform, below the linkage is attached a guide means to insure that the linkage is properly positioned both vertically and horizontally for mating with the linkage engaging apparatus which is attached to the disc periphery.

5 Claims, 1 Drawing Figure

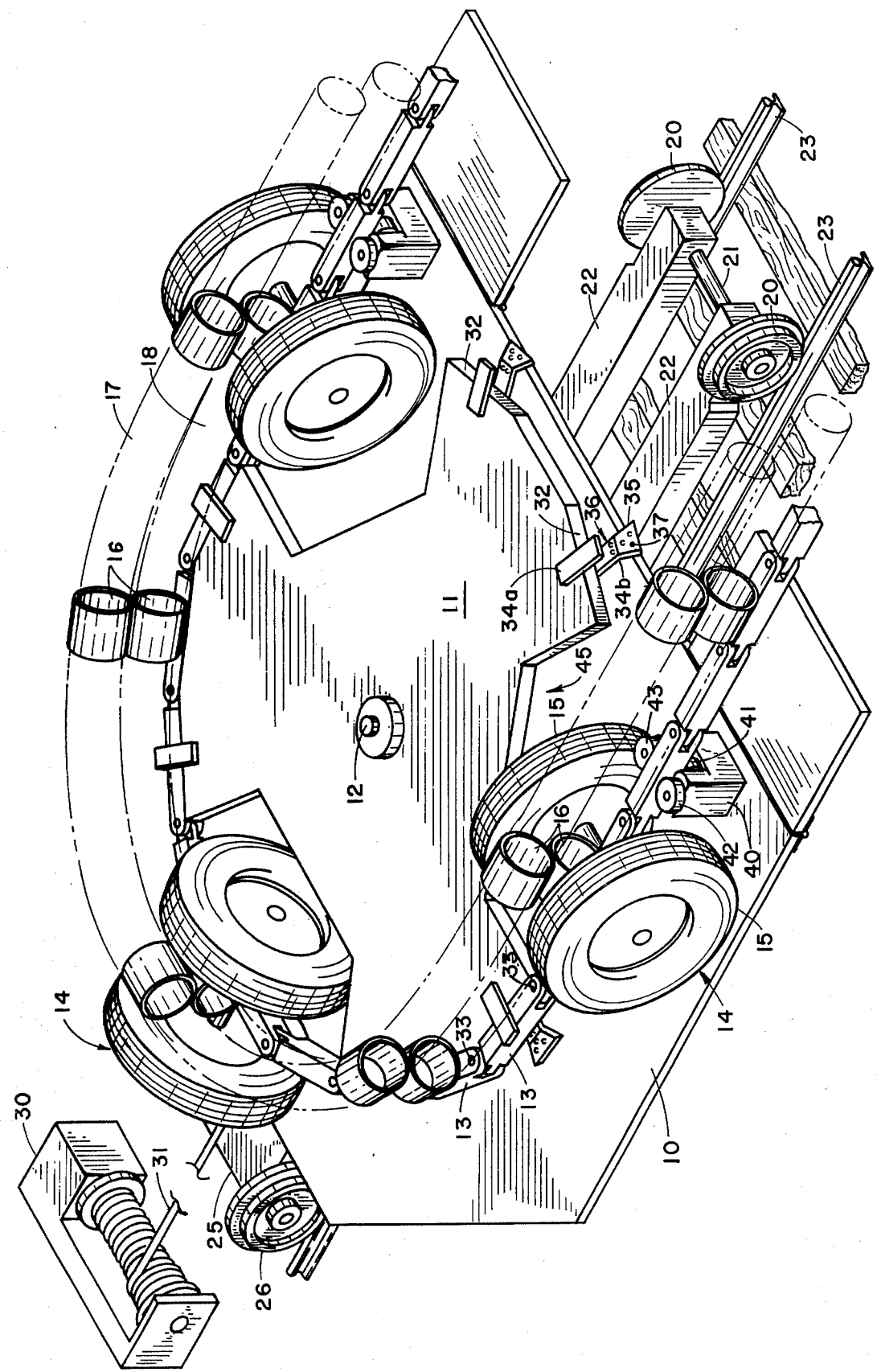

SPROCKET-TYPE LOOP CARRIER

BRIEF DESCRIPTION OF THE PRIOR ART

The best prior art known to Applicants are U.S. Pat. Nos. 3,955,593 issued to Ronald W. Umphrey and David L. McCain; 3,868,964 issued to James H. Tarter, Ronald G. Read, Valentino Colussi and David L. McCain; and 3,860,027 issued to David L. McCain, Gordon R. Haworth and Ronald W. Umphrey.

The last mentioned patent discloses the closest approach to the invention in FIG. 12. In that FIGURE a disc is journaled to a platform and has a plurality of small notches formed in the periphery of the disc. These notches are adapted to engage an extension mounted on the hose clamping structure which in turn is connected to the linkage of the slurry system. When the notches engage the extensions, the disc is rotated lifting the wheels off the ground during the 180° bend.

BRIEF DESCRIPTION OF THE INVENTION

This invention describes an apparatus for directly engaging the linkage during the turn, and essentially comprises a platform which has a disc journaled through its axis to the platform. Large notches are formed into the periphery of the disc to receive a portion of the cart which extends on one side of the linkage. The disc has flattened portions along its periphery having a length equal to the length of the linkages interconnecting sequential carts. There may be one or more linkages and the disc as a consequence will have a corresponding number of flattened portions between the notches formed in the disc to receive the cart. A linkage engaging extension is placed above and below the disc to securely retain the linkage during the turn. Guide means is provided on each side of the platform to insure that the linkage will be in proper position to engage the linkage engaging extension.

BRIEF DESCRIPTION OF THE FIGURE

The FIGURE discloses a perspective view of the 180° bend apparatus illustrating the features of the invention.

DETAILED DESCRIPTION OF THE INVENTION

Referring to the FIGURE, a platform 10 is illustrated having a disc 11 journaled through a bearing 12 to platform 10. The axis of bearing 12 is substantially perpendicular to the surface of platform 10 and also spaces disc 11 above platform 10 so that it lies in substantially the same plane as a plurality of links 13.

A plurality of carts referred to by arrows 14 essentially comprises a base portion (not shown) which has attached thereto a pair of wheels 15 and a pair of hose clamps 16. The slurry hoses 17 and 18 are not illustrated in full view but indicated by dotted lines so that the apparatus of the turn conveyor can be better illustrated. Additional hose clamps 16 may be attached to the linkages between the carts 14 as necessary to properly support slurry hoses 17 and 18, and properly restrain them from leaving linkage 13. Platform 10 is movably supported above the surface of the earth and can be supported in one of several ways. For example, U.S. Pat. No. 3,860,027 illustrates wheels which mount the platform and provide movability to it as well. A further illustration is shown in the remaining two patents previously cited. In the embodiment illustrated, movement is provided by wheels 20 which are journaled through an axle 21 to platform support members 22. Wheels 20 can be rubber tired and engage the surface of the earth directly or wheels 20 can be of the type used on a railroad and engage rails 23, for example. The opposite side of platform 10 is also supported by a truck 25 having wheels 26 journaled thereto which likewise may be rubber tired or the type attached for the use on a rail as illustrated in the FIGURE.

Under normal use the platform 10 must always maintain tension through disc 11 against linkage 13. To accomplish this the preferred embodiment uses a winch 30 which is connected through a cable 31 to truck 25. It is obvious of course that control mechanisms can be automatically incorporated in the winch to operate in a manner to always maintain a predetermined amount of tension on platform 10. Such a control is well known and will not be further described here.

In order to retain the linkage against disc 11 a plurality of flat portions 32 are formed in its periphery. These flat portions have a length substantially equal to the length of the links between the pivots 33. In the embodiment illustrated, five links are shown between each of the carts 14. Three of these links are provided with corresponding flat portions 32 formed in the periphery of disc 11. In order to prevent the linkage from dropping or rising during the 180° bend and thus become disengaged from disc 11, a plurality of linkage engaging means 34a and 34b are attached to the periphery above and below the midpoint of the flat portions formed on the periphery of disc 11. The spacing between the linkage engaging means is the same as the vertical dimension of the linkage in the preferred embodiment. The spacing is accomplished by making the disc 11 dimensionally equal to the vertical height of the linkage. Since there may be some slight misalignment of the linkage when it is in a position to be trapped by linkage engaging means 34a and 34b, 34b is made having a sloped portion 35. To assist in the transition between the slope portion 35 and a nonslope portion 36 a plurality of friction reducing roller bearings 37 are implanted into the sloping portion 35 of linkage engaging means 34b. To further assist in the positioning of linkage 13 prior to being trapped by linkage engaging means 34a and 34b, a linkage guide means 40 is mounted on each side of platform 10 and has journaled therein a first roller 41 which is horizontally journaled and spaced above platform 10 so that the linkage 13 will be at the proper height just prior to being trapped by linkage engaging means 34a and 34b. Movement from side to side of linkage 13 is also restrained by a second roller 42 and a third roller 43, vertically journaled in linkage guide means 40 and attached to engage the opposite sides of linkage 13. Thus, rollers 41, 42 and 43 give two-dimensional positioning to linkage 13 insuring that it will be in proper position to be trapped by linkage engaging means 34a and 34b.

A notch referred to by arrow 45 is formed into disc 11 and is cut deep enough to accept the portion of the cart 14 facing the disc 11 which generally would comprise all of the cart 14 bisected by a plane passing through the linkages 13. It is obvious, of course, that the diameter of the disc 11 must be calculated to provide an equal spacing of notches 45 and flat portions 32 so that continued rotation of disc 11 will have a corresponding notch 45 and flat portion 32 and each cart 14 and link 13 that is to be moved through the 180° bend. In the illustration three notches are shown. Obviously, if more width is permitted, disc 11 could be provided with four or more notches 45.

OPERATION

The 180° bend operates as follows. The conveyor is moved into position in, for example, a mine, where the slurry hoses 17 and 18 are utilized. The linkage 13 is threaded through guide means 40 above roller 41 and between rollers 42 and 43. Disc 11 is then rotated to permit cart 14 to pass into notch 45. Disc 11 will then continue to rotate, moving linkage 13 onto flat portions 32 so that it is trapped between linkage engaging means 34a and 34b. Once the system has passed completely around the conveyor, it is moved to the point where the slurry hoses 17 and 18 are coupled to the end use apparatus. As more hose is utilized, the platform 10 will move on wheels 20 and 26 down track 23. When the apparatus is to be retracted, winch control means 30 will apply tension pulling platform 10 by applying force to truck 25. As platform 10 moves in either direction disc 11 will rotate permitting the linkage to move through guide means 40 and into engagement with disc 11 on one side and release it from disc 11 on the opposite side. Regardless of the direction of rotation of disc 11 the operation is identical; namely, that the linkage is passing through the guide means 40 and being trapped against disc 11 by linkage engaging means 34a and 34b and against flat portions 32 on one side and being released in the reverse order on the opposite side. As previously mentioned, if the linkage should be slightly low the bent down portion of 35 will trap the linkage and move it up the low resistance roller bearings 37 into engagement with flat portion 32.

CONCLUSIONS

A preferred embodiment of a 180° bend conveyor has been illustrated which provides for a positive coupling of the linkage during the conveying process through the bend portion. The preferred embodiment has been illustrated using a platform 10 underneath wheels 14. It is obvious, of course, that an overhead platform can be used equally well as illustrated in U.S. Pat. No. 3,860,027 and this invention is not so limited as to be restricted to a single form of support for disc 11.

It is obvious that other modifications and changes can be made in the device as described in the specification and in the appended claims and still be within the spirit and scope of this invention.

What we claim is:

1. A conveyor apparatus for moving a slurry line which is movably supported by a plurality of wheeled carts, through a 180° bend, and wherein each of said carts is connected by one or more interconnecting linkages attached between said carts, said conveyor including a support frame, means for moving said support frame over the surface of the earth, and a disc, rotatably attached at its axis to said frame, our improvement comprising:
   (a) a plurality of spaced notch means formed in the periphery of said disc each notch means of a size to receive a portion of said wheeled cart extending from said linkages towards said axis; and
   (b) a plurality of upper and lower linkage engaging means each attached to the periphery, each having a linkage engaging surface, and spaced to engage each of said interconnecting linkages and retain said linkages against said periphery while said wheeled carts and linkages are passing through said 180° bend, with a bearing means mounted in the linkage engaging surface of said lower linkage engaging means.

2. A conveyor apparatus as described in claim 1 wherein said periphery of said disc is flattened for a distance equal to the length of each interconnecting link retained against said flattened portion.

3. A conveyor apparatus as described in claim 2 wherein said linkage engaging means comprises an extension attached above and below at least one of said flattened portions between said spaced notch means.

4. An apparatus as described in claim 1 wherein said support frame is a platform movably engaging the surface of the earth by wheels journaled to said platform, said disc journaled to said platform and spaced from said platform a distance so that said linkage and disc lie in substantially the same plane, and linkage guide means attached to said platform under said linkage and extending to engage the side and bottom of said linkage to insure that said linkage is properly positioned to engage said plurality of linkage engaging means.

5. An apparatus as described in claim 4 wherein said linkage guide means comprises a first roller engaging the underside of said linkage, second and third rollers engaging opposite sides of said linkage.

* * * * *